US012785141B2

(12) United States Patent
Tanaka et al.

(10) Patent No.: US 12,785,141 B2
(45) Date of Patent: Nov. 3, 2026

(54) SOLID ELECTROLYTE MATERIAL AND BATTERY USING SAME

(71) Applicant: Panasonic Intellectual Property Management Co., Ltd., Osaka (JP)

(72) Inventors: Yoshiaki Tanaka, Kyoto (JP); Tetsuya Asano, Nara (JP); Akihiro Sakai, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 597 days.

(21) Appl. No.: 18/480,314

(22) Filed: Oct. 3, 2023

(65) Prior Publication Data

US 2024/0039044 A1 Feb. 1, 2024

Related U.S. Application Data

(63) Continuation of application No. PCT/JP2022/004137, filed on Feb. 2, 2022.

(30) Foreign Application Priority Data

Apr. 7, 2021 (JP) ................................ 2021-065380

(51) Int. Cl.
*H01M 10/0562* (2010.01)
*H01M 10/0525* (2010.01)
(Continued)

(52) U.S. Cl.
CPC ... *H01M 10/0562* (2013.01); *H01M 10/0525* (2013.01); *H01B 1/08* (2013.01);
(Continued)

(58) Field of Classification Search
CPC ....... H01B 1/08; H01B 1/10; H01M 10/0525; H01M 10/0562; H01M 2300/0068; H01M 2300/0071; Y02E 60/10
See application file for complete search history.

(56) References Cited

U.S. PATENT DOCUMENTS 10,892,480 B2 1/2021 Goto
12,113,166 B2 10/2024 Tanaka et al.
(Continued)

FOREIGN PATENT DOCUMENTS

CN 102332580 A 1/2012
CN 102456918 A 5/2012
(Continued)

OTHER PUBLICATIONS

Extended European Search Report dated Nov. 12, 2024 issued in the corresponding European Patent Application No. 22784322.4.
(Continued)

*Primary Examiner* — Lingwen R Zeng
(74) *Attorney, Agent, or Firm* — Rimon P.C.

(57) ABSTRACT

A solid electrolyte material of the present disclosure includes: Li; M; O; X; and S. The M is at least one selected from the group consisting of Ti, Zr, and Hf. The X is at least one selected from the group consisting of F, Cl, Br, and I. A molar ratio of the O to the X is more than 0 and 0.3 or less. A battery of the present disclosure includes: a positive electrode; a negative electrode; and an electrolyte layer provided between the positive electrode and the negative electrode. At least one selected from the group consisting of the positive electrode, the negative electrode, and the electrolyte layer includes the solid electrolyte material of the present disclosure.

10 Claims, 3 Drawing Sheets

(51) Int. Cl.
*H01B 1/08* (2006.01)
*H01B 1/10* (2006.01)

(52) U.S. Cl.
CPC ....... *H01B 1/10* (2013.01); *H01M 2300/0068* (2013.01); *H01M 2300/0071* (2013.01); *Y02E 60/10* (2013.01)

(56) References Cited

U.S. PATENT DOCUMENTS

| | | | | |
|---|---|---|---|---|
| 12,237,466 | B2 | 2/2025 | Tanaka et al. | |
| 12,542,300 | B2 | 2/2026 | Tanaka et al. | |
| 2012/0301796 | A1 | 11/2012 | Ohtomo et al. | |
| 2016/0268628 | A1 | 9/2016 | Masuko et al. | |
| 2018/0309167 | A1 | 10/2018 | Kaga et al. | |
| 2019/0237800 | A1 | 8/2019 | Liu et al. | |
| 2020/0083529 | A1 | 3/2020 | Natsui et al. | |
| 2020/0144575 | A1 | 5/2020 | Ku et al. | |
| 2020/0328455 | A1 | 10/2020 | Sakai et al. | |
| 2020/0328465 | A1 | 10/2020 | Sakaida et al. | |
| 2020/0350562 | A1 | 11/2020 | Sugimoto et al. | |
| 2020/0350621 | A1 | 11/2020 | Sugimoto et al. | |
| 2020/0350627 | A1 | 11/2020 | Sugimoto et al. | |
| 2021/0098823 | A1 | 4/2021 | Sakai et al. | |
| 2021/0184201 | A1 | 6/2021 | Choi et al. | |
| 2021/0242494 | A1 | 8/2021 | Tanaka et al. | |
| 2021/0249683 | A1 | 8/2021 | Tanaka et al. | |
| 2021/0296693 | A1 | 9/2021 | Sakai et al. | |
| 2021/0391593 | A1 | 12/2021 | Kubo et al. | |
| 2021/0391594 | A1 | 12/2021 | Kubo et al. | |
| 2022/0102753 | A1 | 3/2022 | Tanaka et al. | |
| 2022/0102755 | A1 | 3/2022 | Miyatake et al. | |
| 2022/0109182 | A1* | 4/2022 | Takahashi ............... | H01M 4/62 |
| 2022/0209287 | A1 | 6/2022 | Tanaka et al. | |
| 2022/0246983 | A1 | 8/2022 | Suzuki et al. | |
| 2022/0393242 | A1 | 12/2022 | Han et al. | |
| 2023/0042911 | A1 | 2/2023 | Sasaki et al. | |
| 2023/0106765 | A1 | 4/2023 | Takeuchi et al. | |
| 2023/0268550 | A1* | 8/2023 | Tanaka ..................... | H01B 1/08 429/323 |
| 2023/0307703 | A1 | 9/2023 | Tanaka et al. | |
| 2023/0307704 | A1 | 9/2023 | Tanaka et al. | |
| 2024/0039044 | A1 | 2/2024 | Tanaka et al. | |
| 2024/0047680 | A1 | 2/2024 | Miyamoto et al. | |
| 2024/0145704 | A1 | 5/2024 | Miyamoto et al. | |
| 2024/0178383 | A1 | 5/2024 | Sagara et al. | |
| 2024/0413394 | A1 | 12/2024 | Tanaka et al. | |

FOREIGN PATENT DOCUMENTS

| | | | |
|---|---|---|---|
| CN | 109626996 | A | 4/2019 |
| CN | 116845344 | A | 10/2023 |
| JP | 2006-156284 | A | 6/2006 |
| JP | 2006-244734 | A | 9/2006 |
| JP | 2009-277383 | A | 11/2009 |
| JP | 2011-129312 | A | 6/2011 |
| JP | 2016-169142 | A | 9/2016 |
| JP | 2020-172410 | A | 10/2020 |
| WO | 2011/073798 | A2 | 6/2011 |
| WO | 2012/112229 | A2 | 8/2012 |
| WO | 2015/079509 | A1 | 6/2015 |
| WO | 2017/141735 | A1 | 8/2017 |
| WO | 2019/135323 | A1 | 7/2019 |
| WO | 2019/146294 | A1 | 8/2019 |
| WO | 2019/146295 | A1 | 8/2019 |
| WO | 2019/146296 | A1 | 8/2019 |
| WO | 2020/070955 | A1 | 4/2020 |
| WO | 2020/137026 | A1 | 7/2020 |
| WO | 2020/137153 | A1 | 7/2020 |
| WO | 2020/137155 | A1 | 7/2020 |
| WO | 2020/188914 | A1 | 9/2020 |
| WO | 2020/188915 | A1 | 9/2020 |
| WO | 2021/024785 | A1 | 2/2021 |
| WO | 2021/049416 | A1 | 3/2021 |
| WO | 2021/220924 | A1 | 11/2021 |

OTHER PUBLICATIONS

Search Report issued on Apr. 17, 2026 in the corresponding Chinese Patent Application No. 202280023205.4, w/English Translation.

International Search Report issued on Apr. 19, 2022 in International Patent Application No. PCT/JP2022/004137, with English translation.

International Search Report issued on Jun. 15, 2021 in International Patent Application No. PCT/JP2021/014089, with English translation.

International Search Report issued on Sep. 28, 2021 in International Patent Application No. PCT/JP2021/031797, with English translation.

International Search Report issued on Oct. 12, 2021 in International Patent Application No. PCT/JP2021/031798, with English translation.

International Search Report of PCT application No. PCT/JP2020/011720 dated Jun. 23, 2020.

International Search Report of PCT application No. PCT/JP2020/034799 dated Dec. 1, 2020.

International Search Report of PCT application No. PCT/JP2022/044223 dated Feb. 7, 2023.

Extended European Search Report dated Jun. 7, 2024 issued in the corresponding European Patent Application No. 21822973.0.

English Translation of Chinese Search Report dated Oct. 28, 2024 for the related Chinese Patent Application No. 202080071776.6.

The Indian OA dated Jul. 26, 2023 for the related Indian Patent Application No. 202147058875.

Fudong Han et al., "Electrochemical Stability of Li10GeP2S12 and Li7La3Zr2012 Solid Electrolytes", Advanced Energy Materials, Jan. 21, 2016, 1501590.

Tetsuya Asano; Akihiro Sakai; Satoru Ouchi; Masashi Sakaida; Akinobu Miyazaki; Shinya Hasegawa: "Solid Halide Electmlytes witll High Lithium-ion Conductivity for Application in 4 V Class Bulk-Type Ali-Solid-State Batteries", Advanced Materials, vol. 30, No. 44, Sep. 14, 2018, pp. 1-7, XP05572199.1, DE, ISSN: 0935-9648, DOi https://doLorg/10.1002/adma.201803075.

Non-Final Office Action dated Jun. 11, 2025 issued in U.S. Appl. No. 18/062,884.

Final Office Action dated Dec. 22, 2025 issued in U.S. Appl. No. 18/062,884.

Non-Final Office Action dated Nov. 17, 2025 issued in U.S. Appl. No. 18/308,320.

Notice of Allowance dated Dec. 12, 2025 issued in U.S. Appl. No. 18/308,329.

Notice of Allowance dated Jul. 29, 2024 issued in U.S. Appl. No. 17/546,134.

Non-Final Office Action dated Aug. 8, 2024 issued in U.S. Appl. No. 17/696,964.

Notice of Allowance dated Nov. 6, 2024 issued in U.S. Appl. No. 17/696,964.

* cited by examiner

SOLID ELECTROLYTE MATERIAL AND BATTERY USING SAME

This application is a continuation of PCT/JP2022/004137 filed on Feb. 2, 2022, which claims foreign priority of Japanese Patent Application No. 2021-065380 filed on Apr. 7, 2021, the entire contents of both of which are incorporated herein by reference.

BACKGROUND OF THE INVENTION

1. Field of the Invention

The present disclosure relates to a solid electrolyte material and a battery using the same.

2. Description of Related Art

WO 2020/070955 A1 discloses a solid electrolyte material represented by $Li_{6-4a}M_aX_6$, where M is at least one selected from the group consisting of Zr, Hf, and Ti, X is a halogen element, and a mathematical relation $0<a<1.5$ is satisfied.

SUMMARY OF THE INVENTION

The present disclosure aims to provide a novel and highly useful solid electrolyte material.

A solid electrolyte material of the present disclosure includes:

Li;

M;

O;

X; and

S, wherein the M is at least one selected from the group consisting of Ti, Zr, and Hf, the X is at least one selected from the group consisting of F, Cl, Br, and I, and a molar ratio of the O to the X is more than 0 and 0.3 or less.

The present disclosure provides a novel and highly useful solid electrolyte material.

DETAILED DESCRIPTION

Figure 1:
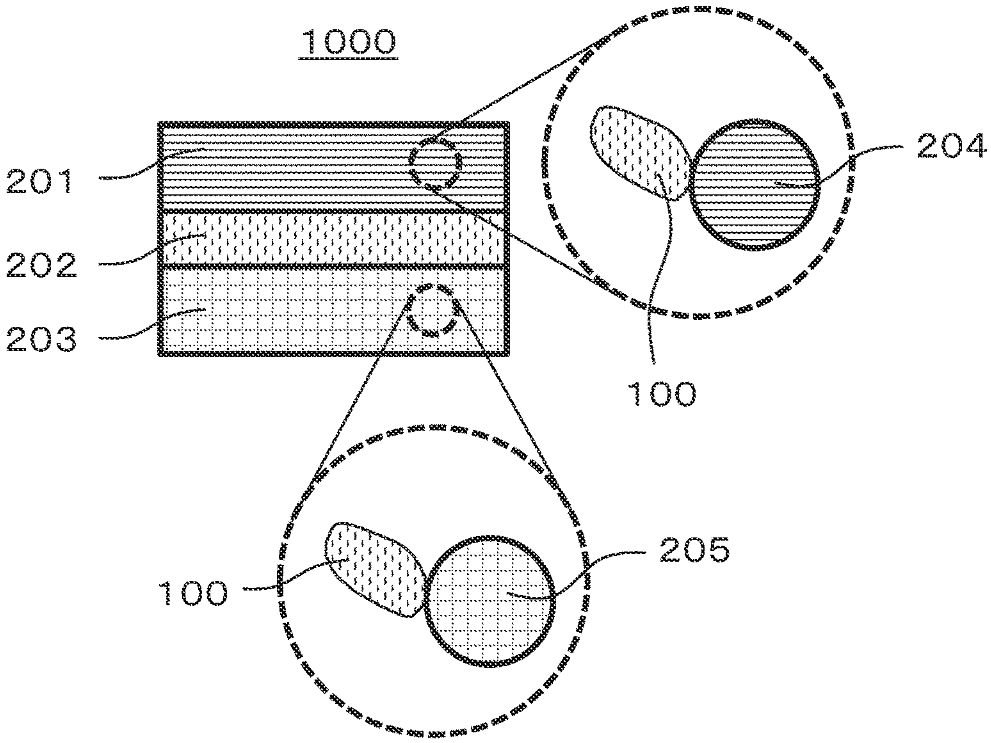
FIG. 1 is a cross-sectional view of a battery 1000 according to a second embodiment.

Embodiments of the present disclosure will be described below with reference to the drawings. The present disclosure is not limited to the following embodiments.

First Embodiment

A solid electrolyte material according to a first embodiment includes Li, M, O, X, and S. M is at least one selected from the group consisting of Ti, Zr, and Hf. X is at least one selected from the group consisting of F, Cl, Br, and I. The molar ratio of O to X is more than 0 and 0.3 or less.

The solid electrolyte material according to the first embodiment is a novel and highly useful solid electrolyte material that is, for example, suitable for conduction of lithium ions. The solid electrolyte material according to the first embodiment can have, for example, a practical lithium-ion conductivity, and can have, for example, a high lithium-ion conductivity.

Here, a high lithium-ion conductivity is, for example, 1.0 mS/cm or more near room temperature. That is, the solid electrolyte material according to the first embodiment can have an ionic conductivity of, for example, 1.0 mS/cm or more.

The solid electrolyte material according to the first embodiment can be used to achieve a battery having excellent charge and discharge characteristics. An example of the battery is an all-solid-state battery. The all-solid-state battery may be a primary battery or a secondary battery.

The solid electrolyte material according to the first embodiment can maintain a high lithium-ion conductivity within an expected battery operating temperature range (e.g., range from −30° C. to 80° C.). Therefore, a battery using the solid electrolyte material according to the first embodiment can stably operate even in an environment where the temperature varies.

To increase the ionic conductivity of the solid electrolyte material, the solid electrolyte material according to the first embodiment may consist substantially of Li, M, O, X, and S. Here, the phrase "the solid electrolyte material according to the first embodiment consists substantially of Li, M, O, X, and S" means that the molar ratio of the sum of the amounts of substance of Li, M, O, X, and S to the total of the amounts of substance of all the elements constituting the solid electrolyte material according to the first embodiment (i.e., the mole fraction) is 90% or more. In an example, the molar ratio may be 95% or more.

To increase the ionic conductivity of the solid electrolyte material, the solid electrolyte material according to the first embodiment may consist of Li, M, O, X, and S.

To increase the ionic conductivity of the solid electrolyte material, M may include Zr. M may be Zr.

To increase the ionic conductivity of the solid electrolyte material, X may include Cl. X may be Cl.

The molar ratio of Li to M is hereinafter denoted also as "Li/M". The molar ratio of O to X is hereinafter denoted also as "O/X". The molar ratio of S to M is hereinafter denoted also as "S/M".

Li/M is calculated from a mathematical expression (the amount of substance of Li)/(the total of the amounts of substance of Ti, Zr, and Hf). O/X is calculated from a mathematical expression (the amount of substance of O)/(the total of the amounts of substance of F, Cl, Br, and I). S/M is calculated from a mathematical expression (the amount of substance of S)/(the total of the amounts of substance of Ti, Zr, and Hf).

The upper and lower limits for Li/M can be defined by any combination of numerical values selected from 1.0, 1.2, 1.6, 2.0, 2.4, and 3.0.

Li/M may be 1.0 or more and 3.0 or less. In this case, the concentration of Li serving as the conduction carrier is optimized. As a result, the solid electrolyte material according to the first embodiment has a high lithium-ion conductivity. To increase the ionic conductivity of the solid electrolyte material, Li/M may be 1.2 or more and 2.4 or less. To further increase the ionic conductivity of the solid electrolyte material, Li/M may be 1.6 or more and 2.4 or less.

The upper and lower limits for O/X can be defined by any combination of numerical values selected from more than 0, 0.05, 0.08, 0.11, 0.13, 0.15, 0.16, 0.17, 0.24, and 0.3.

The upper and lower limits for S/M can be defined by any combination of numerical values selected from more than 0, 0.1, 0.2, 0.3, 0.4, 0.5, and 0.7.

O/X may be 0.05 or more and 0.3 or less. In this case, paths for diffusion of lithium ions are easily formed. As a result, the solid electrolyte material according to the first embodiment has a high lithium-ion conductivity. O/X may be 0.05 or more and 0.24 or less.

S/M may be 0.1 or more and 0.7 or less. In this case, paths for diffusion of lithium ions are easily formed. As a result, the solid electrolyte material according to the first embodiment has a high lithium-ion conductivity. To increase the ionic conductivity of the solid electrolyte material, S/M may be 0.2 or more and 0.5 or less.

The solid electrolyte material according to the first embodiment may be crystalline or amorphous.

The solid electrolyte material according to the first embodiment may be amorphous. An amorphous solid electrolyte has advantages such as no crystalline orientation anisotropy and less influence of the grain boundary as well as less deterioration in ionic conductivity after processing such as pulverization.

The solid electrolyte material according to the first embodiment may include a crystalline phase. The crystalline phase is attributed to, for example, LiX or $Li_{6-4a}M_aX_6$ (a mathematical relation $0<a<1.5$ is satisfied).

The solid electrolyte material according to the first embodiment may include both or only one of an amorphous phase and a crystalline phase. The microstructure of the solid electrolyte material can be examined by X-ray diffraction measurement.

The shape of the solid electrolyte material according to the first embodiment is not limited. The shape is, for example, acicular, spherical, or ellipsoidal. The solid electrolyte material according to the first embodiment may be particulate. The solid electrolyte material according to the first embodiment may be in the shape of a pellet or a plate.

In the case where the solid electrolyte material according to the first embodiment is particulate (e.g., spherical), the solid electrolyte material may have a median diameter of 0.1 μm or more and 100 μm or less, or may have a median diameter of 0.5 μm or more and 10 μm or less. In this case, the solid electrolyte material according to the first embodiment and other materials can be favorably dispersed. The median diameter of particles means the particle diameter (d50) at a cumulative volume equal to 50% in the volumetric particle size distribution. The volumetric particle size distribution can be measured with a laser diffraction analyzer or an image analyzer.

<Method of Manufacturing Solid Electrolyte Material>

The solid electrolyte material according to the first embodiment can be manufactured by the following method.

Raw material powders are prepared so as to obtain a target composition. Examples of the raw material powders include an oxide, a hydroxide, a halide, and an acid halide.

In an example, assume a case where a solid electrolyte material consists of Li, Zr, O, Cl, and S (M is Zr and X is Cl) and has a molar ratio Li/M of 1.6, a molar ratio O/X of 0.175, and a molar ratio S/M of 0.2 in the raw material mixing. In this case, $Li_2O$, LiOH, $ZrCl_4$, and $Li_2S$ are mixed together in a molar ratio of $Li_2O$:LiOH:$ZrCl_4$:$Li_2S$=0.5:0.2:1:0.2. M and X are determined by selecting the raw material powders. The molar ratios Li/M, O/X, and S/M are determined by selecting the mixing ratio between the raw material powders. The raw material powders may be mixed together in a molar ratio adjusted in advance so as to cancel out a composition change which can occur in the synthesis process.

The mixture of the raw material powders is fired to obtain a reaction product. To suppress evaporation of the raw materials due to firing, the mixture of the raw material powders may be sealed in an airtight container formed of quartz glass or borosilicate glass and fired in a vacuum or an inert gas atmosphere. The inert gas atmosphere is, for example, an argon atmosphere or a nitrogen atmosphere.

Alternatively, the mixture of the raw material powders may be reacted with each other mechanochemically in a mixer, such as a planetary ball mill, to obtain a reaction product. That is, mixing and reaction of the raw material powders may be performed by mechanochemical milling. By these methods, the solid electrolyte material according to the first embodiment is obtained.

Firing or mechanochemical reaction of the mixture of the raw material powders sometimes causes a portion of O to evaporate from the raw material powders. This can result in a smaller value of the molar ratio O/X in the solid electrolyte material than the value of the molar ratio O/X calculated from the molar ratio between the raw material powders.

The composition of the solid electrolyte material can be determined, for example, by ICP emission spectrometry, ion chromatography, inert gas fusion-infrared absorptiometry, or electron probe micro analysis (EPMA). For example, the composition of Li and M can be determined by ICP emission spectrometry, the composition of X can be determined by ion chromatography, the composition of O can be determined by inert gas fusion-infrared absorptiometry, and the composition of S can be determined by EPMA.

Second Embodiment

A second embodiment will be described below. The matters described in the first embodiment may be omitted as appropriate.

A battery according to the second embodiment includes a positive electrode, an electrolyte layer, and a negative electrode. The electrolyte layer is disposed between the positive electrode and the negative electrode. At least one selected from the group consisting of the positive electrode, the electrolyte layer, and the negative electrode includes the solid electrolyte material according to the first embodiment.

Owing to inclusion of the solid electrolyte material according to the first embodiment, the battery according to the second embodiment has excellent charge and discharge characteristics.

FIG. 1 is a cross-sectional view of a battery 1000 according to the second embodiment.

The battery 1000 includes a positive electrode 201, an electrolyte layer 202, and a negative electrode 203. The electrolyte layer 202 is disposed between the positive electrode 201 and the negative electrode 203.

The positive electrode 201 includes positive electrode active material particles 204 and solid electrolyte particles 100.

The electrolyte layer 202 includes an electrolyte material.

The negative electrode 203 includes negative electrode active material particles 205 and the solid electrolyte particles 100.

The solid electrolyte particles 100 are particles including the solid electrolyte material according to the first embodiment. The solid electrolyte particles 100 may be particles including the solid electrolyte material according to the first embodiment as the main component. The particles including the solid electrolyte material according to the first embodiment as the main component refer to particles in which the component contained in the largest amount in molar ratio is the solid electrolyte material according to the first embodiment. The solid electrolyte particles 100 may be particles consisting of the solid electrolyte material according to the first embodiment.

The positive electrode 201 includes a material capable of occluding and releasing metal ions such as lithium ions. The positive electrode 201 includes, for example, a positive electrode active material (e.g., the positive electrode active material particles 204).

Examples of the positive electrode active material include a lithium-containing transition metal oxide, a transition metal fluoride, a polyanion material, a fluorinated polyanion material, a transition metal sulfide, a transition metal oxysulfide, and a transition metal oxynitride. Examples of the lithium-containing transition metal oxide include $Li(Ni,Co,Al)O_2$, $Li(Ni,Co,Mn)O_2$, and $LiCoO_2$.

In the present disclosure, an expression "(A,B,C)" refers to "at least one selected from the group consisting of A, B, and C".

From the viewpoint of the cost and safety of the battery, lithium phosphate may be used as the positive electrode active material.

In the case where the positive electrode 201 includes a solid electrolyte material according to the first embodiment in which X includes I (i.e., iodine), lithium iron phosphate may be used as the positive electrode active material. The solid electrolyte material according to the first embodiment that includes I is susceptible to oxidation. In the case where lithium iron phosphate is used as the positive electrode active material, an oxidation reaction of the solid electrolyte material is suppressed. That is, formation of an oxide layer having a low lithium-ion conductivity is suppressed. As a result, the battery has a high charge and discharge efficiency.

The positive electrode 201 may include, in addition to the solid electrolyte material according to the first embodiment, a transition metal oxyfluoride as the positive electrode active material. The solid electrolyte material according to the first embodiment is not susceptible to formation of a resistance layer even when the solid electrolyte material is fluorinated by the transition metal fluoride. As a result, the battery has a high charge and discharge efficiency.

The transition metal oxyfluoride contains oxygen and fluorine. In an example, the transition metal oxyfluoride may be a compound represented by a composition formula $Li_pMe_qO_mF_n$. Here, Me is at least one selected from the group consisting of Mn, Co, Ni, Fe, Al, Cu, V, Nb, Mo, Ti, Cr, Zr, Zn, Na, K, Ca, Mg, Pt, Au, Ag, Ru, W, B, Si, and P, and the following mathematical relations are satisfied: $0.5 \leq p \leq 1.5$; $0.5 \leq q \leq 1.0$; $1 \leq m < 2$; and $0 < n \leq 1$. An example of such a transition metal oxyfluoride is $Li_{1.05}(Ni_{0.35}Co_{0.35}Mn_{0.3})_{0.95}O_{1.9}F_{0.1}$.

The positive electrode active material particles 204 may have a median diameter of 0.1 μm or more and 100 μm or less. In the case where the positive electrode active material particles 204 have a median diameter of 0.1 μm or more, the positive electrode active material particles 204 and the solid electrolyte particles 100 can form a favorable dispersion state in the positive electrode 201. This enhances the charge and discharge characteristics of the battery. In the case where the positive electrode active material particles 204 have a median diameter of 100 μm or less, the diffusion rate of lithium in the positive electrode active material particles 204 is enhanced. This enables the battery to operate at a high power.

The positive electrode active material particles 204 may have a larger median diameter than the solid electrolyte particles 100. In this case, the positive electrode active material particles 204 and the solid electrolyte particles 100 can form a favorable dispersion state.

To increase the energy density and the power output of the battery, the ratio of the volume of the positive electrode active material particles 204 to the sum of the volume of the positive electrode active material particles 204 and the volume of the solid electrolyte particles 100 in the positive electrode 201 may be 0.30 or more and 0.95 or less.

Figure 2:
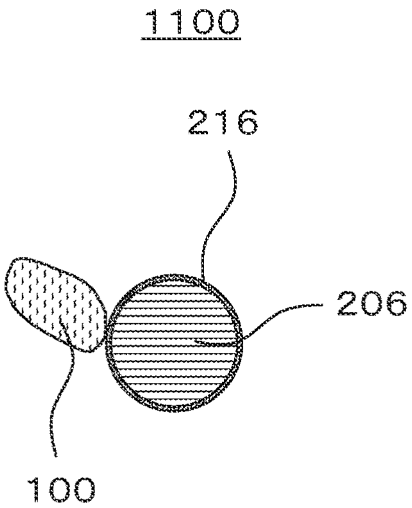
FIG. 2 is a cross-sectional view of an electrode material 1100 according to the second embodiment.

FIG. 2 is a cross-sectional view of an electrode material 1100 according to the second embodiment. The electrode material 1100 is, for example, included in the positive electrode 201. To prevent the solid electrolyte particles 100 from reacting with the positive electrode active material (i.e., electrode active material particles 206), a coating layer 216 may be formed on the surface of each of the electrode active material particles 206. In this case, an increase in the reaction overvoltage of the battery can be suppressed. Examples of the coating material included in the coating layer 216 include a sulfide solid electrolyte, an oxide solid electrolyte, and a halide solid electrolyte.

In the case where the solid electrolyte particles 100 are those of a solid electrolyte material according to the first embodiment in which X includes I, the coating material may be a solid electrolyte material according to the first embodiment in which X is at least one selected from the group consisting of Cl and Br. A solid electrolyte material according to the first embodiment that does not include I is less susceptible to oxidation than a solid electrolyte material according to the first embodiment that includes I. As a result, the battery has a high charge and discharge efficiency.

In the case where the solid electrolyte particles 100 are those of the solid electrolyte material according to the first embodiment in which X includes I, the coating material may include an oxide solid electrolyte. The oxide solid electrolyte may be lithium niobate, which exhibits an excellent stability even at a high potential. In this case, the battery has a high charge and discharge efficiency.

The positive electrode 201 may consist of a first positive electrode layer including a first positive electrode active material and a second positive electrode layer including a second positive electrode active material. Here, the second positive electrode layer is disposed between the first positive electrode layer and the electrolyte layer 202, the first positive electrode layer and the second positive electrode layer include the solid electrolyte material according to the first embodiment that includes I, and the coating layer 216 is formed on the surface of the second positive electrode active material. According to the above configuration, it is possible to suppress oxidation of the solid electrolyte material according to the first embodiment included in the electrolyte layer 202 caused by the second positive electrode active material. As a result, the battery has a high charge capacity. Examples of the coating material included in the coating layer 216 include a sulfide solid electrolyte, an oxide solid electrolyte, a polymer solid electrolyte, and a halide solid electrolyte. Note that in the case where the coating material is a halide solid electrolyte, the coating material does not include I as a halogen element. The first positive electrode active material may be the same material as the second positive electrode active material, or may be a different material from the second positive electrode active material.

To increase the energy density and the power output of the battery, the positive electrode 201 may have a thickness of 10 μm or more and 500 μm or less.

The electrolyte layer 202 includes an electrolyte material. The electrolyte material is, for example, a solid electrolyte material. The electrolyte layer 202 may be a solid electrolyte layer. The electrolyte layer 202 may include the solid electrolyte material according to the first embodiment. The electrolyte layer 202 may consist of the solid electrolyte material according to the first embodiment.

The solid electrolyte material according to the first embodiment is hereinafter referred to as a first solid electrolyte material. The solid electrolyte material different from the solid electrolyte material according to the first embodiment is referred to as a second solid electrolyte material.

The electrolyte layer 202 may include the first solid electrolyte material, and in addition, include the second solid electrolyte material. In the electrolyte layer 202, the first solid electrolyte material and the second solid electrolyte material may be homogenously dispersed. A layer consisting of the first solid electrolyte material and a layer consisting of the second solid electrolyte material may be stacked along the stacking direction of the battery 1000.

The electrolyte layer 202 may consist of the second solid electrolyte material.

The electrolyte layer 202 may have a thickness of 1 μm or more and 100 μm or less. In the case where the electrolyte layer 202 has a thickness of 1 μm or more, a short-circuit between the positive electrode 201 and the negative electrode 203 tends not to occur. In the case where the electrolyte layer 202 has a thickness of 100 μm or less, the battery can operate at a high power.

Another electrolyte layer may be further provided between the electrolyte layer 202 and the negative electrode 203. That is, a second electrolyte layer may be further provided between the electrolyte layer 202 and the negative electrode 203. For example, in the case where the electrolyte layer 202 includes the first solid electrolyte material, the second electrolyte layer may consist of another solid electrolyte material that is electrochemically more stable than the first solid electrolyte material. Specifically, the solid electrolyte material constituting the second electrolyte layer may have a lower reduction potential than the first solid electrolyte material. In this case, the first solid electrolyte material can be used without being reduced. As a result, the charge and discharge efficiency of the battery can be enhanced.

The negative electrode 203 includes a material capable of occluding and releasing metal ions such as lithium ions. The negative electrode 203 includes, for example, a negative electrode active material (e.g., the negative electrode active material particles 205).

Examples of the negative electrode active material include a metal material, a carbon material, an oxide, a nitride, a tin compound, and a silicon compound. The metal material may be a metal simple substance or an alloy. Examples of the metal material include a lithium metal and a lithium alloy. Examples of the carbon material include natural graphite, coke, semi-graphitized carbon, a carbon fiber, spherical carbon, artificial graphite, and amorphous carbon. From the viewpoint of capacity density, suitable examples of the negative electrode active material include silicon (i.e., Si), tin (i.e., Sn), a silicon compound, and a tin compound.

The negative electrode active material may be selected on the basis of the reduction resistance of the solid electrolyte material included in the negative electrode 203. In the case where the negative electrode 203 includes the first solid electrolyte material, the negative electrode active material to be used may be a material capable of occluding and releasing lithium ions at 1.6 V or more versus lithium. In the case where such a material is used as the negative electrode active material, reduction of the first solid electrolyte material included in the negative electrode 203 can be suppressed. As a result, the battery has a high charge and discharge efficiency. Examples of the material include a titanium oxide, an indium metal, and a lithium alloy. Examples of the titanium oxide include $Li_4Ti_5O_{12}$, $LiTi_2O_4$, and $TiO_2$.

The negative electrode active material particles 205 may have a median diameter of 0.1 μm or more and 100 μm or less. In the case where the negative electrode active material particles 205 have a median diameter of 0.1 μm or more, the negative electrode active material particles 205 and the solid electrolyte particles 100 can form a favorable dispersion state in the negative electrode 203. This enhances the charge and discharge characteristics of the battery. In the case where the negative electrode active material particles 205 have a median diameter of 100 μm or less, the diffusion rate of lithium in the negative electrode active material particles 205 is enhanced. This enables the battery to operate at a high power.

The negative electrode active material particles 205 may have a larger median diameter than the solid electrolyte particles 100. In this case, the negative electrode active material particles 205 and the solid electrolyte particles 100 can form a favorable dispersion state.

To increase the energy density and the power output of the battery, the ratio of the volume of the negative electrode active material particles 205 to the sum of the volume of the negative electrode active material particles 205 and the volume of the solid electrolyte particles 100 in the negative electrode 203 may be 0.30 or more and 0.95 or less.

The electrode material 1100 shown in FIG. 2 may be included in the negative electrode 203. To prevent the solid electrolyte particles 100 from reacting with the negative electrode active material (i.e., the electrode active material particles 206), the coating layer 216 may be formed on the surface of each of the electrode active material particles 206. In this case, the battery has a high charge and discharge efficiency. Examples of the coating material included in the coating layer 216 include a sulfide solid electrolyte, an oxide solid electrolyte, a polymer solid electrolyte, and a halide solid electrolyte.

In the case where the solid electrolyte particles 100 are those of the first solid electrolyte material, the coating material may be an oxide solid electrolyte or a polymer solid electrolyte. An example of the oxide solid electrolyte is trilithium phosphate. An example of the polymer solid electrolyte is a composite compound of polyethylene oxide and a lithium salt. Such a polymer solid electrolyte is, for example, lithium bis(trifluoromethanesulfonyl)imide.

To increase the energy density and the power output of the battery, the negative electrode 203 may have a thickness of 10 μm or more and 500 μm or less.

To increase the ionic conductivity, at least one selected from the group consisting of the positive electrode 201, the electrolyte layer 202, and the negative electrode 203 may include the second solid electrolyte material. Examples of the second solid electrolyte material include a sulfide solid electrolyte, an oxide solid electrolyte, a halide solid electrolyte, and an organic polymer solid electrolyte.

In the present disclosure, the “sulfide solid electrolyte” refers to a solid electrolyte containing sulfur as the main component among the contained anions. The “oxide solid electrolyte" refers to a solid electrolyte containing oxygen as the main component among the contained anions. The "halide solid electrolyte" refers to a solid electrolyte containing a halogen element as the main component among the contained anions. The main component among the contained anions refers to an anion having the highest amount of substance among all the anions constituting the solid electrolyte.

Examples of the sulfide solid electrolyte include $Li_2S—P_2S_5$, $Li_2S—SiS_2$, $Li_2S—B_2S_3$, $Li_2S—GeS_2$, $Li_{3.25}Ge_{0.25}P_{0.75}S_4$, and $Li_{10}GeP_2S_{12}$.

Examples of the oxide solid electrolyte include:

(i) a NASICON solid electrolyte, such as $LiTi_2(PO_4)_3$ or its element-substituted substance;

(ii) a perovskite solid electrolyte, such as $(LaLi)TiO_3$;

(iii) a LISICON solid electrolyte, such as $Li_{14}ZnGe_4O_{16}$, $Li_4SiO_4$, $LiGeO_4$, or element-substituted substance;

(iv) a garnet solid electrolyte, such as $Li_7La_3Zr_2O_{12}$ or its element-substituted substance; and (v) $Li_3PO_4$ and its N-substituted substance.

An example of the halide solid electrolyte is a compound represented by $Li_aMe'_bY_cZ_6$. Here, mathematical relations a+mb+3c=6 and c>0 are satisfied. Me' is at least one selected from the group consisting of metalloid elements and metal elements except Li and Y. Z is at least one selected from the group consisting of F, Cl, Br, and I. The value m represents the valence of Me'.

The "metalloid elements" refer to B, Si, Ge, As, Sb, and Te. The "metal elements" refer to all the elements included in Groups 1 to 12 of the periodic table (except hydrogen) and all the elements included in Groups 13 to 16 of the periodic table (except B, Si, Ge, As, Sb, Te, C, N, P, O, S, and Se).

To increase the ionic conductivity of the halide solid electrolyte, Me' may be at least one selected from the group consisting of Mg, Ca, Sr, Ba, Zn, Sc, Al, Ga, Bi, Zr, Hf, Ti, Sn, Ta, and Nb.

Examples of the halide solid electrolyte include $Li_3YCl_6$ and $Li_3YBr_6$.

An example of the organic polymer solid electrolyte is a compound of a polymer compound and a lithium salt. The polymer compound may have an ethylene oxide structure. A polymer compound having an ethylene oxide structure can contain a large amount of a lithium salt, and accordingly has a higher ionic conductivity.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from these may be used alone. Alternatively, a mixture of two or more lithium salts selected from these may be used.

To facilitate transfer of lithium ions and thereby enhance the output characteristics of the battery, at least one selected from the group consisting of the positive electrode 201, the electrolyte layer 202, and the negative electrode 203 may include a nonaqueous electrolyte solution, a gel electrolyte, or an ionic liquid.

The nonaqueous electrolyte solution contains a nonaqueous solvent and a lithium salt dissolved in the nonaqueous solvent. Examples of the nonaqueous solvent include a cyclic carbonate solvent, a linear carbonate solvent, a cyclic ether solvent, a linear ether solvent, a cyclic ester solvent, a linear ester solvent, and a fluorinated solvent. Examples of the cyclic carbonate solvent include ethylene carbonate, propylene carbonate, and butylene carbonate. Examples of the linear carbonate solvent include dimethyl carbonate, ethyl methyl carbonate, and diethyl carbonate. Examples of the cyclic ether solvent include tetrahydrofuran, 1,4-dioxane, and 1,3-dioxolane. Examples of the linear ether solvent include 1,2-dimethoxyethane and 1,2-diethoxyethane. Examples of the cyclic ester solvent include γ-butyrolactone. Examples of the linear ester solvent include methyl acetate. Examples of the fluorinated solvent include fluoroethylene carbonate, methyl fluoropropionate, fluorobenzene, fluoroethyl methyl carbonate, and fluorodimethylene carbonate. One nonaqueous solvent selected from these may be used alone. Alternatively, a mixture of two or more nonaqueous solvents selected from these may be used.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from these may be used alone. Alternatively, a mixture of two or more lithium salts selected from these may be used. The lithium salt has a concentration, for example, in a range of 0.5 mol/L to 2 mol/L.

The gel electrolyte that can be used is a polymer material impregnated with a nonaqueous electrolyte solution. Examples of the polymer material include polyethylene oxide, polyacrylonitrile, polyvinylidene fluoride, polymethyl methacrylate, and a polymer having an ethylene oxide bond.

Examples of the cation contained in the ionic liquid include:

(i) an aliphatic linear quaternary salt, such as tetraalkylammonium or tetraalkylphosphonium;

(ii) an aliphatic cyclic ammonium, such as pyrrolidinium, morpholinium, imidazolinium, tetrahydropyrimidinium, piperazinium, or piperidinium; and (iii) a nitrogen-containing heterocyclic aromatic cation, such as pyridinium or imidazolium.

Examples of the anion contained in the ionic liquid include $PF_6-$, $BF_4-$, $SbF_6-$, $AsF_6-$, $SO_3CF_3-$, $N(SO_2CF_3)_2-$, $N(SO_2C_2F_5)_2-$, $N(SO_2CF_3)(SO_2C_4F_9)$ and $C(SO_2CF_3)_3-$.

The ionic liquid may contain a lithium salt.

To enhance the adhesion between particles, at least one selected from the group consisting of the positive electrode 201, the electrolyte layer 202, and the negative electrode 203 may contain a binder.

Examples of the binder include polyvinylidene fluoride, polytetrafluoroethylene, polyethylene, polypropylene, aramid resin, polyamide, polyimide, polyamide-imide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinylpyrrolidone, polyether, polyethersulfone, hexafluoropolypropylene, styrene-butadiene rubber, and carboxymethylcellulose. As the binder, a copolymer may be used. Examples of the binder include a copolymer of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. A mixture of two or more selected from the above materials may be used.

To increase the electronic conductivity, at least one selected from the group consisting of the positive electrode 201 and the negative electrode 203 may contain a conductive additive.

Examples of the conductive additive include:

(i) graphite, such as natural graphite or artificial graphite;

(ii) carbon black, such as acetylene black or ketjen black;

(iii) a conductive fiber, such as a carbon fiber or a metal fiber;
(iv) fluorinated carbon;
(v) a metal powder, such as an aluminum powder;
(vi) a conductive whisker, such as a zinc oxide whisker or a potassium titanate whisker;
(vii) a conductive metal oxide, such as titanium oxide; and
(viii) a conductive polymer compound, such as polyaniline compound, polypyrrole compound, or polythiophene compound. To reduce the cost, the conductive additive in (i) or (ii) above may be used.

Examples of the shape of the battery according to the second embodiment include a coin type, a cylindrical type, a prismatic type, a sheet type, a button type, a flat type, and a stack type.

The battery according to the second embodiment may be manufactured, for example, by preparing a material for forming a positive electrode, a material for forming an electrolyte layer, and a material for forming a negative electrode, and producing by a known method a stack in which the positive electrode, the electrolyte layer, and the negative electrode are disposed in this order.

EXAMPLES

The present disclosure will be described below in more detail with reference to examples and a comparative example.

Example 1

[Production of Solid Electrolyte Material]

In a dry atmosphere with a dew point of −30° C. or less (hereinafter referred to as a "dry atmosphere"), raw material powders of $Li_2O$, LiOH, $ZrCl_4$, and $Li_2S$ were prepared in a molar ratio of $Li_2O$:LiOH:$ZrCl_4$:$Li_2S$=0.5:0.2:1:0.2. These raw material powders were mixed together in a mortar to obtain a mixed powder. The obtained mixed powder was milled with a planetary ball mill at 600 rpm for 24 hours. Thus, a solid electrolyte material according to Example 1 was obtained.

[Composition Analysis on Solid Electrolyte Material]

As for the obtained solid electrolyte material according to Example 1, the content of Li and the content of Zr were measured by high-frequency inductively coupled plasma emission spectrometry with a high-frequency inductively coupled plasma emission spectrometer (iCAP7400 manufactured by Thermo Fisher Scientific K.K.). The content of Cl was measured by ion chromatography with an ion chromatography device (ICS-2000 manufactured by Dionex Corporation). The content of O was measured by inert gas fusion-infrared absorptiometry with an oxygen analyzer (EMGA-930 manufactured by HORIBA, Ltd.). The molar ratio Li/M, the molar ratio O/X, and the molar ratio S/M were calculated from the measurement results. The content of S adopted here was the charge amount.

The solid electrolyte material according to Example 1 had a molar ratio Li/M of 1.6, a molar ratio O/X of 0.16, and a molar ratio S/M of 0.2.

[Ionic Conductivity Evaluation]

Figure 3:
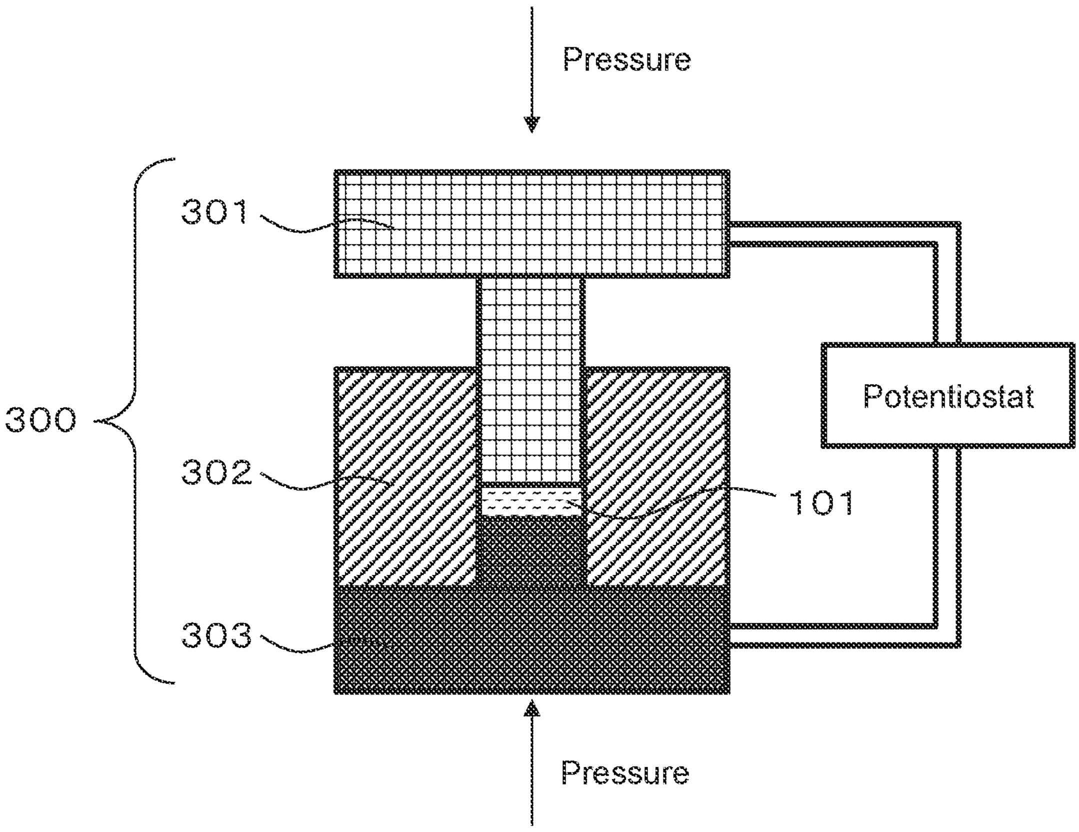
FIG. 3 is a schematic view of a pressure-molding die 300 used to evaluate the ionic conductivity of solid electrolyte materials.

FIG. 3 is a schematic view of a pressure-molding die 300 used to evaluate the ionic conductivity of solid electrolyte materials.

The pressure-molding die 300 included an upper punch 301, a die 302, and a lower punch 303. The die 302 was formed of polycarbonate, which is insulating. The upper punch 301 and the lower punch 303 were each formed of stainless steel, which is electronically conductive.

The pressure-molding die 300 shown in FIG. 3 was used to measure the ionic conductivity of the solid electrolyte material according to Example 1 by the following method.

In a dry atmosphere, the pressure-molding die 300 was filled with the powder of the solid electrolyte material according to Example 1 (i.e., a solid electrolyte material powder 101 in FIG. 3). Inside the pressure-molding die 300, a pressure of 300 MPa was applied to the solid electrolyte material according to Example 1 with the upper punch 301. Thus, an evaluation cell according to Example 1 was obtained.

While the pressure was applied to the evaluation cell, the upper punch 301 and the lower punch 303 were connected to a potentiostat (VersaSTAT4 manufactured by Princeton Applied Research) equipped with a frequency response analyzer. The upper punch 301 was connected to the working electrode and the potential measurement terminal. The lower punch 303 was connected to the counter electrode and the reference electrode. The ionic conductivity of the solid electrolyte material according to Example 1 was measured at room temperature by an electrochemical impedance measurement method. The results indicate that the ionic conductivity measured at 22° C. was 2.0 mS/cm.

[Production of Battery]

In an argon atmosphere with a dew point of −60° C. or less, the solid electrolyte material according to Example 1 and $LiCoO_2$ were prepared in a volume ratio of the solid electrolyte material:$LiCoO_2$=30:70. These materials were mixed together in an agate mortar. Thus, a positive electrode mixture was obtained.

In an insulating cylinder having an inner diameter of 9.5 mm, the solid electrolyte material according to Example 1 (80 mg) and the positive electrode mixture (8.2 mg) were stacked to obtain a stack. A pressure of 360 MPa was applied to this stack to form a solid electrolyte layer and a positive electrode. The solid electrolyte layer had a thickness of 500 μm.

Next, a Li—In alloy (thickness: 200 μm) was stacked on the solid electrolyte layer. A pressure of 80 MPa was applied to this stack to form a negative electrode.

Next, stainless steel current collectors were attached to the positive electrode and the negative electrode, and current collector leads were attached to the current collectors.

Finally, an insulating ferrule was used to block the inside of the insulating cylinder from the outside air atmosphere and hermetically seal the cylinder.

Thus, a battery according to Example 1 was obtained.

[Charge and Discharge Test]

Figure 4:
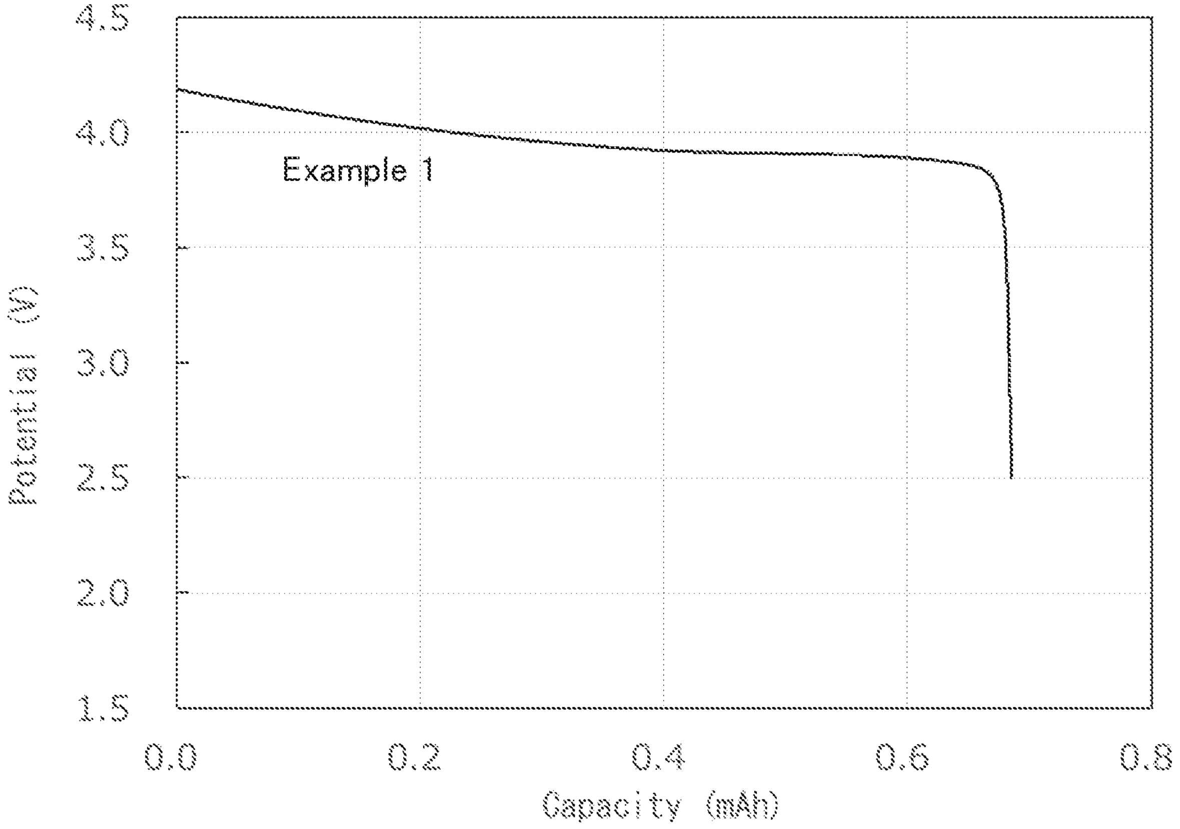
FIG. 4 is a graph showing the initial discharge characteristics of a battery according to Example 1.

FIG. 4 is a graph showing the initial discharge characteristics of the battery according to Example 1. The horizontal axis represents the discharge capacity. The vertical axis represents the voltage. The results shown in FIG. 4 were obtained from measurement performed by the following method.

The battery according to Example 1 was placed in a thermostatic chamber maintained at 25° C.

The battery according to Example 1 was charged to a voltage of 3.6 V at a current value equivalent to 0.05 C rate (20-hour rate) relative to the theoretical capacity of the battery. Next, the battery according to Example 1 was discharged to a voltage of 1.9 V at a current value equivalent to 0.05 C rate.

The results of the charge and discharge test indicate that the battery according to Example 1 had an initial discharge capacity of 0.68 mAh.

Examples 2 to 9 and Comparative Example 1

[Production of Solid Electrolyte Material]

In Example 2, raw material powders of $Li_2O$, LiOH, $ZrCl_4$, and $Li_2S$ were prepared in a molar ratio of $Li_2O$:LiOH:$ZrCl_4$:$Li_2S$=0.4:0.2:1:0.3.

In Example 3, raw material powders of $Li_2O$, LiOH, $ZrCl_4$, and $Li_2S$ were prepared in a molar ratio of $Li_2O$:LiOH:$ZrCl_4$:$Li_2S$=0.2:0.2:1:0.5.

In Example 4, raw material powders of LiOH, $ZrCl_4$, and $Li_2S$ were prepared in a molar ratio of LiOH:$ZrCl_4$:$Li_2S$=0.2:1:0.7.

In Example 5, raw material powders of $Li_2O$, LiOH, $ZrCl_4$, and $Li_2S$ were prepared in a molar ratio of $Li_2O$:LiOH:$ZrCl_4$:$Li_2S$=0.6:0.2:1:0.1.

In Example 6, raw material powders of $Li_2O$, LiOH, $ZrCl_4$, and $Li_2S$ were prepared in a molar ratio of $Li_2O$:LiOH:$ZrCl_4$:$Li_2S$=0.9:0.2:1:0.2.

In Example 7, raw material powders of $Li_2O$, LiOH, $ZrCl_4$, and $Li_2S$ were prepared in a molar ratio of $Li_2O$:LiOH:$ZrCl_4$:$Li_2S$=0.7:0.2:1:0.2.

In Example 8, raw material powders of $Li_2O$, LiOH, $ZrCl_4$, and $Li_2S$ were prepared in a molar ratio of $Li_2O$:LiOH:$ZrCl_4$:$Li_2S$=0.3:0.2:1:0.2.

In Example 9, raw material powders of $Li_2O$, LiOH, $ZrCl_4$, and $Li_2S$ were prepared in a molar ratio of $Li_2O$:LiOH:$ZrCl_4$:$Li_2S$=0.5:0.2:1:0.4.

In Comparative Example 1, raw material powders of LiCl and $ZrCl_4$ were prepared in a molar ratio of LiCl:$ZrCl_4$=2:1.

Solid electrolyte materials according to Examples 2 to 9 and Comparative Example 1 were obtained as in Example 1 except for the matters described above.

[Composition Analysis on Solid Electrolyte Material]

As in Example 1, composition analysis was performed on the solid electrolyte materials according to Examples 2 to 9 and Comparative Example 1.

The solid electrolyte material according to Example 2 had a molar ratio Li/M of 1.6, a molar ratio O/X of 0.13, and a molar ratio S/M of 0.3.

The solid electrolyte material according to Example 3 had a molar ratio Li/M of 1.6, a molar ratio O/X of 0.08, and a molar ratio S/M of 0.5.

The solid electrolyte material according to Example 4 had a molar ratio Li/M of 1.6, a molar ratio O/X of 0.05, and a molar ratio S/M of 0.7.

The solid electrolyte material according to Example 5 had a molar ratio Li/M of 1.6, a molar ratio O/X of 0.17, and a molar ratio S/M of 0.1.

The solid electrolyte material according to Example 6 had a molar ratio Li/M of 2.4, a molar ratio O/X of 0.24, and a molar ratio S/M of 0.2.

The solid electrolyte material according to Example 7 had a molar ratio Li/M of 2.0, a molar ratio O/X of 0.19, and a molar ratio S/M of 0.2.

The solid electrolyte material according to Example 8 had a molar ratio Li/M of 1.2, a molar ratio O/X of 0.11, and a molar ratio S/M of 0.2.

The solid electrolyte material according to Example 9 had a molar ratio Li/M of 2.0, a molar ratio O/X of 0.15, and a molar ratio S/M of 0.4.

The solid electrolyte material according to Comparative Example 1 had a molar ratio Li/M of 2.0, a molar ratio O/X of 0, and a molar ratio S/M of 0.

[Ionic Conductivity Evaluation]

As in Example 1, ionic conductivity measurement was performed on the solid electrolyte materials according to Examples 2 to 9 and Comparative Example 1. The measurement results are shown in Table 1.

TABLE 1

| | Constituent element | M | X | Molar ratio Li/M | Molar ratio O/X | Molar ratio S/M | Ionic conductivity [mS/cm] |
|---|---|---|---|---|---|---|---|
| Example 1 | Li, Zr, O, Cl, S | Zr | Cl | 1.6 | 0.16 | 0.2 | 2.0 |
| Example 2 | | Zr | Cl | 1.6 | 0.13 | 0.3 | 2.0 |
| Example 3 | | Zr | Cl | 1.6 | 0.08 | 0.5 | 1.7 |
| Example 4 | | Zr | Cl | 1.6 | 0.05 | 0.7 | 1.2 |
| Example 5 | | Zr | Cl | 1.6 | 0.17 | 0.1 | 1.3 |
| Example 6 | | Zr | Cl | 2.4 | 0.24 | 0.2 | 2.0 |
| Example 7 | | Zr | Cl | 2.0 | 0.19 | 0.2 | 2.3 |
| Example 8 | | Zr | Cl | 1.2 | 0.11 | 0.2 | 1.0 |
| Example 9 | | Zr | Cl | 2.0 | 0.15 | 0.4 | 1.9 |
| Comparative Example 1 | Li, Zr, Cl | Zr | Cl | 2.0 | 0 | 0 | 0.40 |

Discussion

As is clear from Table 1, the solid electrolyte materials according to Examples 1 to 9 each have a high ionic conductivity of 1.0 mS/cm or more near room temperature.

As is clear from comparing Examples 1 to 7 and 9 with Example 8, a solid electrolyte material having a molar ratio Li/M of 1.6 or more and 2.4 or less has a higher ionic conductivity. As is clear from comparing Examples 1 to 3 with Examples 4 and 5, all of which have a molar ratio Li/M of the same value, a solid electrolyte material having a molar ratio S/M of 0.2 or more and 0.5 or less has a higher ionic conductivity.

Ti, Zr, and Hf are each a transition metal element of Group 4. Accordingly, replacement of part or the whole of Zr with at least one selected from the group consisting of Ti and Hf is presumed to also achieve a desired effect. Similarly, replacement of part or the whole of Cl, which is a halogen element, with at least one selected from the group consisting of F, Br, and I is presumed to also achieve a desired effect.

The battery according to Example 1 was charged and discharged at room temperature.

As described above, the solid electrolyte material according to the present disclosure is a highly useful material that can, for example, enhance the lithium-ion conductivity, and is suitable for providing batteries that can be favorably charged and discharged.

INDUSTRIAL APPLICABILITY

The solid electrolyte material of the present disclosure is used, for example, in all-solid-state lithium-ion secondary batteries.

What is claimed is:

1. A solid electrolyte material comprising:

Li;

M;

X; and

O;

S, wherein the M is at least one selected from the group consisting of Ti, Zr, and Hf, the X is at least one selected from the group consisting of F, Cl, Br, and I, and a molar ratio of the O to the X is more than 0 and 0.3 or less.

2. The solid electrolyte material according to claim 1, wherein the M includes Zr.

3. The solid electrolyte material according to claim 1, wherein the X includes Cl.

4. The solid electrolyte material according to claim 1, wherein a molar ratio of the Li to the M is 1.0 or more and 3.0 or less.

5. The solid electrolyte material according to claim 4, wherein the molar ratio of the Li to the M is 1.2 or more and 2.4 or less.

6. The solid electrolyte material according to claim 5, wherein the molar ratio of the Li to the M is 1.6 or more and 2.4 or less.

7. The solid electrolyte material according to claim 1, wherein the molar ratio of the O to the X is 0.05 or more and 0.3 or less.

8. The solid electrolyte material according to claim 1, wherein a molar ratio of the S to the M is 0.1 or more and 0.7 or less.

9. The solid electrolyte material according to claim 8, wherein the molar ratio of the S to the M is 0.2 or more and 0.5 or less.

10. A battery comprising:

a positive electrode;

a negative electrode; and an electrolyte layer disposed between the positive electrode and the negative electrode, wherein at least one selected from the group consisting of the positive electrode, the negative electrode, and the electrolyte layer includes the solid electrolyte material according to claim 1.

* * * * *